(12) United States Patent
Bella et al.

(10) Patent No.: US 10,329,785 B2
(45) Date of Patent: Jun. 25, 2019

(54) LIFEGUARD POSITIONING SYSTEM

(71) Applicant: ROBSON FORENSIC, INC., Lancaster, PA (US)

(72) Inventors: Maria Bella, Reading, PA (US); Bret W. Johnson, Lancaster, PA (US)

( * ) Notice: Subject to any disclaimer, the term of this patent is extended or adjusted under 35 U.S.C. 154(b) by 67 days.

(21) Appl. No.: 15/094,098

(22) Filed: Apr. 8, 2016

(65) Prior Publication Data

US 2017/0294019 A1 Oct. 12, 2017

(51) Int. Cl.
| | |
|---|---|
| *G06K 9/00* | (2006.01) |
| *E04H 4/14* | (2006.01) |
| *G06T 7/70* | (2017.01) |
| *H04N 5/247* | (2006.01) |
| *H04N 5/225* | (2006.01) |
| *G01B 11/00* | (2006.01) |
| *G01B 11/06* | (2006.01) |
| *G06T 7/73* | (2017.01) |

(52) U.S. Cl.
CPC ............ *E04H 4/14* (2013.01); *G01B 11/002* (2013.01); *G01B 11/0608* (2013.01); *G06T 7/70* (2017.01); *G06T 7/73* (2017.01); *H04N 5/2251* (2013.01); *H04N 5/247* (2013.01); *G06T 2207/10004* (2013.01); *G06T 2207/10024* (2013.01); *G06T 2207/30208* (2013.01); *G06T 2207/30232* (2013.01)

(58) Field of Classification Search
CPC .... E04H 4/14; G06T 7/73; G06T 7/70; G06T 2207/10004; G06T 2207/30208; G06T 2207/10024; G06T 2207/30232; H04N 5/2251; H04N 5/247; G01B 11/0608; G01B 11/002
See application file for complete search history.

(56) References Cited

U.S. PATENT DOCUMENTS

| | | | |
|---|---|---|---|
| 3,947,833 A | 3/1976 | Eckstein, Jr. | |
| 4,146,897 A * | 3/1979 | Wilson | .............. H01Q 1/084 343/882 |
| 5,043,705 A | 8/1991 | Rooz et al. | |
| 6,127,930 A | 10/2000 | Steffanus | |
| 6,133,838 A | 10/2000 | Meniere | |
| 7,123,746 B2 | 10/2006 | Meniere et al. | |
| 9,157,250 B2 | 10/2015 | Allammari | |
| 2004/0036766 A1 | 2/2004 | Meniere et al. | |
| 2004/0062441 A1 | 4/2004 | Meniere et al. | |
| 2016/0093233 A1* | 3/2016 | Boulware | ............ B23K 9/0026 219/136 |

* cited by examiner

*Primary Examiner* — Tom Y Lu

(57) ABSTRACT

A device and method of determining proper positioning of lifeguard stations at a swimming pool to minimize the risk of bather drowning. The method includes: positioning submersible devices or other objects at the bottom of a swimming pool according to an established grid or pattern; imaging the devices from different locations and different heights at the same locations; analyzing the images to determine the position and height of the locations which provide the best sightlines of the swimming pool from the surface of the water to the bottom of the pool shell; and positioning the lifeguard stations at the position and height of the locations determined by analyzing the images.

18 Claims, 5 Drawing Sheets

LIFEGUARD POSITIONING SYSTEM

FIELD OF THE INVENTION

The present invention is a lifeguard line of sight testing system to prevent drowning incidents in swimming pools. In particular, the invention is directed to a system that facilitates in the determination of the proper positioning of lifeguard stations to ensure that the lifeguards can properly see the entire pool or the assigned zone.

BACKGROUND OF THE INVENTION

At present, in many instances, the surveillance of swimming pools is carried out by human monitoring. This type of monitoring is made difficult because of reflection, refraction, and water agitation, which can make it difficult to identify visually a motionless body at a depth of less than a meter when a lifeguard is not properly positioned.

The risk of drowning in a swimming pool occurs primarily when a bather is not sufficiently capable of swimming, for example in the case of a young child, or when a swimmer succumbs to a medical emergency. In the first case, lifeguards on duty or individuals close to the bather in distress may have their attention attracted by the bather himself, in particular if the bather is momentarily able to flap his arms while trying to stay on the surface. In the second case, however, the swimmer may lose consciousness without attracting attention from lifeguards or nearby swimmers. A bather who is unable to raise his head above water will experience respiratory impairment and then respiratory distress. Without intervention, a bather in respiratory distress will progress to cardiac arrest. Depending on the body structure of the bather in distress and the amount of water inhaled and ingested during the drowning process, a bather who has suffered this type of incident may sink to the bottom of the pool or, less commonly, he may also float unconscious below the surface of the water.

When respiratory impairment begins, which marks the onset of drowning, an experienced lifeguard, in particular skilled in artificial resuscitation, has less than three minutes to give aid to the victim. If proper aid is given within this time, the victim will not generally suffer long-term physiological effects from the incident. In general, if aid is given between three and five minutes after consciousness has been lost, a time which nevertheless varies between individuals, the victim may survive but there is risk of irreversible brain damage. Biological death occurs at the point at which irreversible brain damage begins (4 to 6 minutes without oxygen) and clinical death occurs within minutes thereafter.

Various devices have been proposed to provide assistance to lifeguards in the detection of distressed swimmers/bathers. One such device is disclosed in U.S. Pat. No. 5,043,705, which is directed to the use of sonar for monitoring a swimming pool. According to this device, at least one sonar transmitter/receiver is provided on the bottom of the swimming pool, and a layer is monitored using this equipment. However, a device of this type has a considerable drawback because, in order to install the sonar and connect it to the processing equipment which derives information from the echoes which are received, it is necessary to route cables through the bottom of the swimming pool and below this bottom, which leads to an entirely prohibitive cost if the pool has already been constructed. Moreover, safety rules prohibit the use of voltages in excess of 12 or 24 volts, depending on the country, close to the water in a swimming pool, whereas it is necessary to use voltages of several hundred volts in order to generate sonar pulses. Furthermore, the signal obtained with sonar includes echoes due to the swimming pool walls, and it is extremely difficult to eliminate the noise signal thus obtained in order to make it possible to detect the signal corresponding to the submerged body of a drowning individual. In addition, sonar essentially makes it possible to identify the body of a drowning individual by the volume of air which it contains; if a victim has his lungs filled with water, the signal obtained will not at all conform to what might be expected and may even not be identified by the signal processing. It will therefore be understood that a system of this type cannot be satisfactory.

It has also been proposed, to use cameras working in the visible wavelength range to monitor a swimming pool, these cameras being arranged in such a way that the observed region lies in a volume close to and parallel with the bottom of the swimming pool. In this device, the cameras only observe a layer of water parallel to the bottom, which means that the number of cameras needs to be increased if the bottom is not flat, as well as leaving most of the volume of the swimming pool unmonitored. Furthermore, this device does not make it possible to detect motionless bodies just below the surface of the water. Lastly, the cameras and their accessories are immersed in the swimming pool, which is unacceptable in terms of safety and causes considerable problems in connecting them to the signal processing equipment associated with them. This device cannot therefore be satisfactory.

Other technology based surveillance systems for a swimming pool are known. These systems may include one or numerous control screens which are positioned by the lifeguards' chairs or in the offices of the persons responsible for surveillance of the swimming pool. Alarms may be given through a sound and/or visual warning, in particular with an indication of the zone of the swimming pool in which a suspicious event is taking place.

However, such systems are often not perfect, allowing various significant events to go undetected. For example, it is not always possible to distinguish a shadow of a body of a swimmer passively floating, moving along the bottom, as numerous conditions must be met for the detection systems to work properly. In various systems, it is desirable for the viewpoints to be close to the object being observed. This first condition implies that numerous cameras will be used for surveillance over a large zone in relation to the dimensions of the objects that one hopes to detect. In correlation, this type of system is consequently particularly costly. For optimum use, it is desirable that the depiction of colors perceived by each camera is identical. Consequently, it is essential for the opto-electronic characteristics of the video cameras to be the same, which is not always the case. In addition the optical route between the object and each camera may cross environments with different refraction or transparency indexes. This is notably the case when the body being observed is submerged in a swimming pool with a turbulent surface. The depiction of the colors of the object being observed by each camera is not the same. Consequently the geometric correlations that make it possible to establish that the images (their outlines and grey scale nuances) produced by each camera come from the same dense object situated in front of a colored bottom, cannot be verified with certainty. Consequently, confusion is possible between a shade of color (for example a shadow being carried) on the bottom of the swimming pool and a dense object close to the bottom. Consequently, the result is that errors in detection and false initiation of the alarm systems.

In addition, the installation of complicated technology based systems is not practical in many existing swimming pools. Existing swimming pools may not have the infrastructure to support the installation of the systems. In addition, even if the systems could be installed, the price of installation and operation may be prohibitive.

It would, therefore, be beneficial to provide a system and equipment for properly and optimally positioning lifeguard stations around a swimming pool to provide the lifeguards with proper views of the entire pool to prevent drowning incidents. In addition, it would be beneficial to provide a system and equipment which can be used with existing swimming pools to minimize drowning incidents without incurring significant installation and maintenance costs.

SUMMARY OF THE INVENTION

An object of the invention is to provide a system and equipment for properly and optimally positioning lifeguard stations around a swimming pool to provide the lifeguards with proper views of the entire pool to prevent drowning incidents.

An object of the invention is to provide a system and equipment that can be used with existing swimming pools to minimize drowning incidents without incurring significant installation and maintenance costs.

An object of the invention is to provide a system and method that allows for the critical analysis of the pool space to identify the various factors which affect the ability of a lifeguard to supervise swimmers/bathers and recognize someone in distress.

An embodiment is directed to a method of determining proper positioning of lifeguard stations at a swimming pool to minimize the risk of bather drowning. The method includes: positioning submersible devices on the bottom of the swimming pool according to an established grid or pattern; imaging the devices from different locations and different heights at the same locations; analyzing the images to determine the position and height of the locations which provide the best sightlines of the swimming pool from the surface of the water to the bottom of the pool shell; and positioning the lifeguard stations at the optimum position and height of the locations determined by image analysis.

An embodiment is directed to a device for capturing images to facilitate the placement of lifeguard stations around a pool. The device includes a support member with multiple mounting stations provided thereon, the mounting stations being vertically aligned. Imaging capturing equipment is mounted on the mounting stations. Adjustable legs are provided to allow the device to be free standing. A leveling measurement device is provided to indicate when the support member is moved to a vertical position. Wherein the device can be adjusted to position and maintain the support member in the vertical position.

An embodiment is directed to a method of determining proper positioning of lifeguard stations at a swimming pool to minimize the risk of bather drowning. The method includes: positioning submersible devices on the bottom of the swimming pool according to an established grid or pattern; positioning an imaging device at different locations proximate to the swimming pool; imaging the devices from different heights at the each of the different locations; analyzing the images from each location and each height to determine the position and height of the locations which provide the best sightlines of the swimming pool from the surface of the water to the bottom of the pool shell; and positioning the lifeguard stations at the position and height of the locations determined by image analysis.

An embodiment is directed to a device for placement in a swimming pool to facilitate the placement of lifeguard stations around the pool. The device includes a base having a weighted portion with sufficient weight to cause the device to sink to the bottom of the pool. The device also includes moveable members extending from the base. The moveable members have less weight than the base, thereby allowing the moveable members to move and sway as the current of water in the pool changes. The device is used to simulate a submerged swimmer/bather in the pool.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
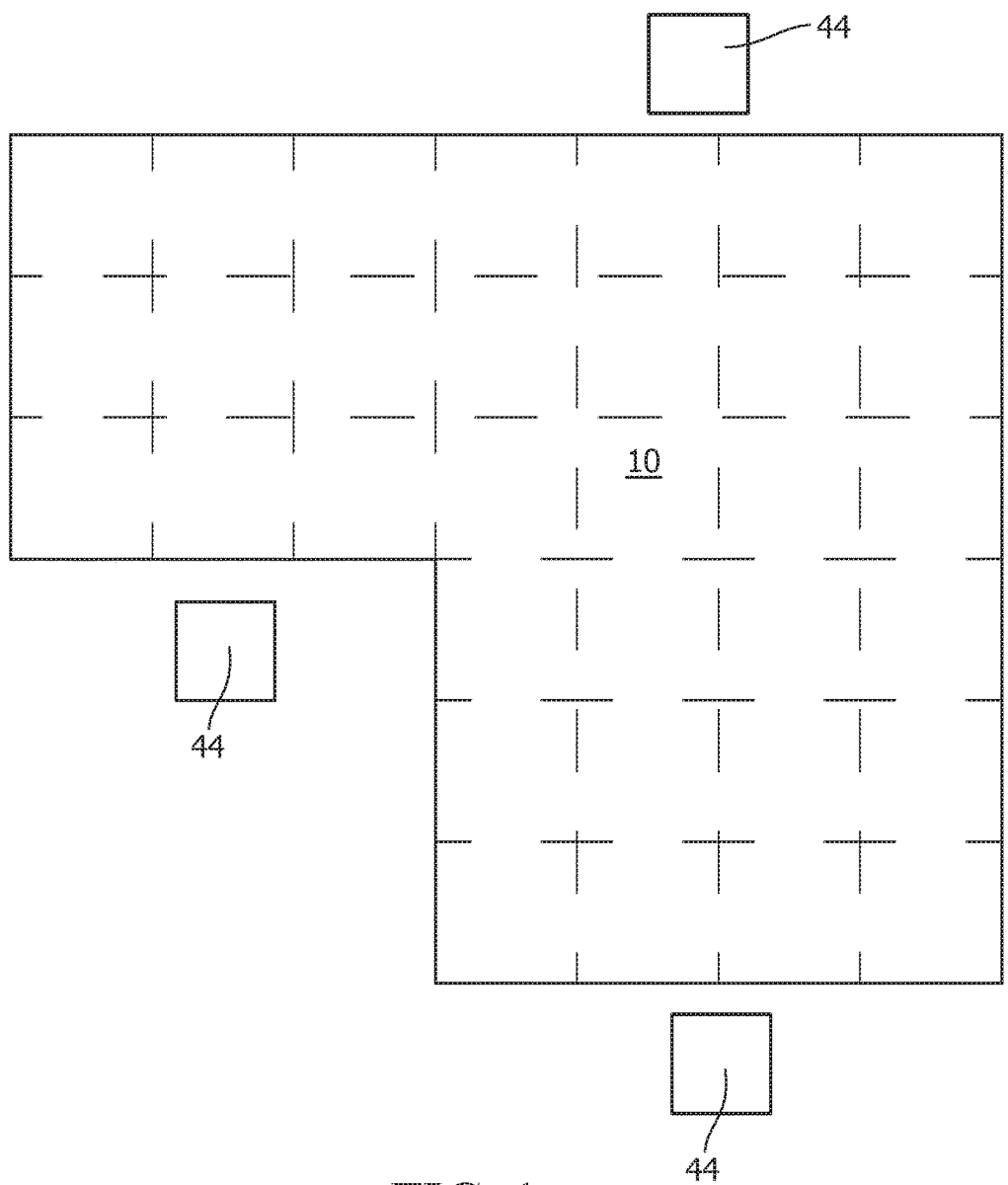
FIG. 1 is a diagrammatic view of an illustrative swimming pool with lifeguard stations positioned proximate thereto, the swimming pool having representative grid lines positioned thereon.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

The positioning of lifeguards is a critical factor that contributes to lifeguard effectiveness in preventing injuries and responding to drownings at public swimming pools and water parks. If the lifeguards cannot see all of the bathers in the water, the lifeguards cannot effectively supervise and protect the bathers.

The Lifesaving Society's Public Aquatic Facility Safety Standards state: "The supervision position(s) of lifeguards must be designed to eliminate blind spots in the pool area. It must be possible for the lifeguard team to observe all bathers in the pool area. Facility management and staff must analyze the pool area and implement systems that provide coverage of blind spots. These systems might include the use of elevated lifeguard stations, walking lifeguard patrols or the use of observation tools such as large mirrors or video cameras and monitors."

To develop a system of effective lifeguard positions and patrols, the staff of public aquatic facilities must carry out a systematic analysis of the pool environment. The analysis must evaluate how the physical design of the pool, the pool equipment, and the customer activities impact the lifeguarding requirements. This analysis is used to determine the positioning of the lifeguards and also considers the number of lifeguards required to safely supervise pool users.

Analysis of the pool environment includes utilizing devices that identify sightlines from all potential lifeguard positions. These devices identify blind spots from each location and identify locations where glare and other light effects interfere with lifeguard supervision. Developing images of the pool showing the affect of each of the factors will provide the staff with the information needed to develop a system of proper lifeguard positions for the facility.

As the proper number and positioning of lifeguards at public pools has a significant potential to reduce the risk of drowning, the invention is directed to, but not limited to, a system and equipment for properly and optimally positioning lifeguard stations around a swimming pool to provide the lifeguards with proper views of the entire pool to prevent drowning incidents. The system and equipment can be used with new swimming pools or with existing swimming pools to minimize drowning incidents without incurring significant installation and maintenance costs.

Known methods of lifeguard placement include, but are not limited to, analyzing the response time, water surface area, number of swimmers/bathers, depth of the water, and features or obstacles that may interfere with sight lines. The present system also analyzes this information. In addition, the present system uses devices and methods which have not been used previously to determine the optimal positioning, including the height, of the lifeguard station placement.

Figure 2:
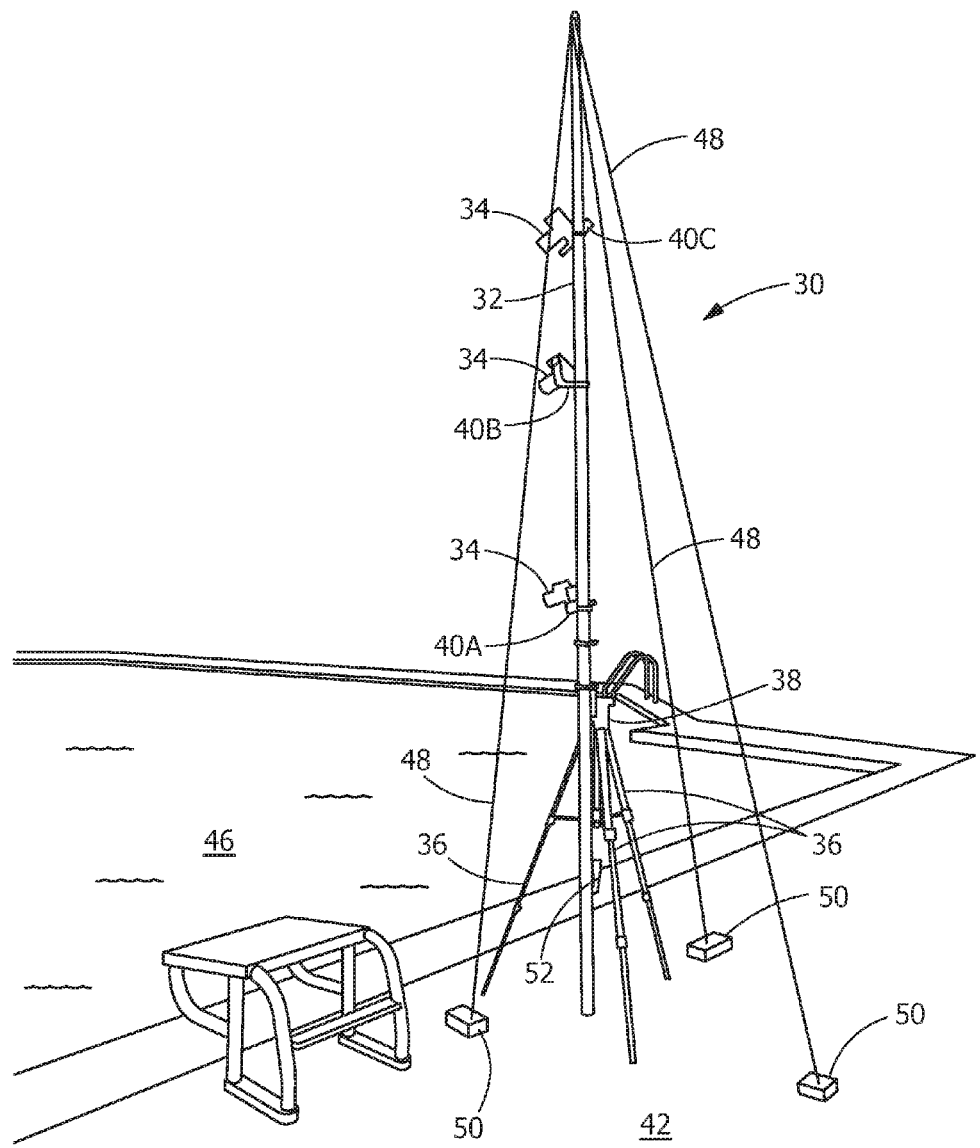
FIG. 2 is a perspective view of an illustrative image capturing device for capturing images which is used to gather data to facilitate the proper positioning of the lifeguard stations.

As shown in FIG. 2, an imaging capturing device 30 for capturing images is shown. The device includes a support member 32, such as, but not limited to, a post or rod. The support member 32 may be one piece or may be multiple pieces which can telescope to allow for easy transportation and storage. The support member 32 may be made from any material having the strength and stiffness characteristics to maintain its shape when the support member 32 is fully extended and image capturing equipment 34 is positioned thereon.

Legs 36 are positioned proximate to the support member 32. The legs 36 are connected to and support the support member 32 at connection member 38. In the embodiment shown, the three legs 36 are provided to form a tripod. However, other configurations may be used without departing from the scope of the invention. Each of the legs 36 may be one piece or may be multiple pieces which can telescope to allow for easy transportation and storage. The legs 36 may be made from any material having the strength and stiffness characteristics to maintain its shape when the support member 32 is fully extended and image capturing equipment 34 is positioned thereon.

In one exemplary embodiment, the connection member 38 is fixedly mounted to the support member 32. In this embodiment, in order to adjust the vertical positioning of the support member 32, the legs 36 and/or support member 32 are telescoping to allow for the vertical adjustment. In another exemplary embodiment, the connection member 38 is pivotally mounted to the support member 32. In this embodiment, the vertical positioning of the support member 32 may be accomplished by rotating, moving or pivoting the support member 32 relative to the connection member 38 and legs 36.

Mounting stations 40 are provided on the support member 32. The mounting stations 40 are configured to cooperate with and mount image capturing equipment 34, such as, but not limited to cameras that have simultaneous shutter release or video equipment, to the support member 32. In the embodiment shown, three mounting stations 40 are provided. The first mounting station 40A is positioned approximately 5.5 feet from the ground surface 42. The second mounting station 40B is positioned approximately 8.5 feet from the ground surface 42. The third mounting station 40C is positioned approximately 10.5 feet from the ground surface 42. These distances are chosen to conform to the distances which the eyes of a lifeguard are generally located depending upon the height of the lifeguard and the lifeguard stand or station 44. For example, 5.5 feet approximates the position of a lifeguard's eyes when seated on a seat positioned 3 feet above ground level; 8.5 feet approximates the position of a lifeguard's eyes when seated on a 6 foot tall lifeguard stand, and 10.5 feet approximates the position of a lifeguard's eyes when seated on a 8 foot tall lifeguard stand. However, other numbers of mounting stations 40 and other heights of the mounting stations 40 may be used without departing from the scope of the invention.

In the embodiment shown, the mounting stations 40 are able to pivot, move or rotate relative to the support member 32. This allows the image capturing equipment 34 to be positioned at the proper angle relative to the support member 32 and relative to the surface of the water 46 to properly capture the required images. The ability of the mounting stations 40 to move relative to the support member 32 allows the support member to be located at different distances from the edge of the swimming pool 10.

As shown, the image capturing equipment 34 is mounted to the mounting stations 40 using known mounting methods, such as, but not limited to, mounting screws. The image capturing equipment 34 may be operated by timer, wireless control, plunger cord or other known methods.

In the embodiment shown, positioning ropes or cables 48 extend from proximate the top of the support member 32. The support cables 48 have weights 50 at the free end thereof. The support cables 48 and weights 50 are used to stabilize the support member 32 and properly align the support member 32. However, other types devices and methods can be used to stabilize the support member 32.

A leveling measurement device 52 is provided to cooperate with support member 32. In the embodiment shown, the leveling measurement device 52 is attached to the support member 32. However, the leveling measurement device 52 may be a separate member. The leveling measurement device 52 may be, but is not limited to, a level.

In use, it is beneficial to have the support member 32 in a vertical position. This allows the mounting stations 40 and the image capturing equipment 34 to be properly positioned in a vertical arrangement, thereby ensuring that the images are not distorted or inaccurate based on vertical misalignment. The use of the leveling measurement device 52 allows for the proper orientation. If the support member 32 is not initially vertical, the legs 36 can be adjusted. If the support member 32 is moveable relative to the connection member 38, the support member 32 may be rotated to vertical, either in addition to the movement of the legs 36 or in place of the movement of the legs 36. If the support member 32 is moved, the support cables 48 and the weights 50 are moved to the appropriate position to maintain the support member 32 in the vertical position.

Figure 3:
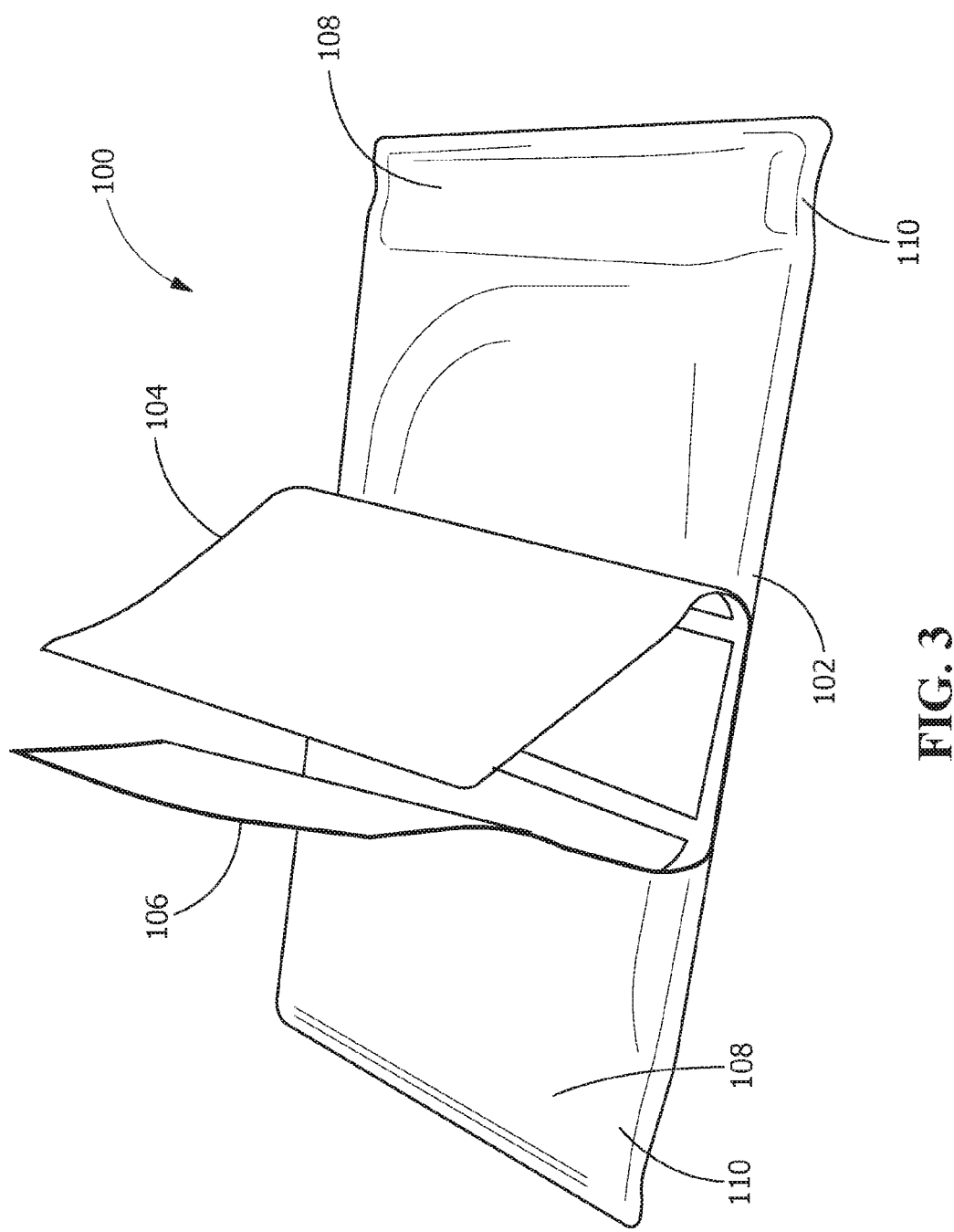
FIG. 3 is a perspective view of a submersible device that is used as a visual guide to facilitate the proper positioning of the lifeguard stations; the device is shown as it would appear in the swimming pool.

Referring to FIG. 3, a specifically constructed submersible device 100 is shown. FIG. 3 represents the device 100 when it is positioned in the pool 10. The device 100 is made of waterproof material that is constructed to be positioned in a swimming pool 10 without damage to the device 100 or the pool 10 and without injuring the occupants of the pool 10 or interfering with the chemical parameters of the pool. Such materials, include, but are not limited to vinyl and plastic. In the illustrative embodiment shown, the material of the device 100 has multiple colors that allow for line of sight to be detected without yielding false negative or false positive results. When placed in the pool 10, the device 100 is used to simulate a submerged swimmer/bather. The device 100 is constructed to be submersible and to simulate the approximate dimensions of a two and one-half to three year old child in a fetal position, the smallest person likely to be unattended at a public swimming pool. However, other dimensions of the device 100 can be used.

As best shown in FIG. 3, the device 100 has a base 102 and moveable members 104, 106. The base 102 includes a weighted portion 108 that has sufficient weight to cause the device 100 to remain at a specific location in the pool 10. The weighted portion 108 can include any material which has the weight required. Such material, includes, but is not limited to, sand or metal strips. In the illustrative embodiment shown, the material is housed in pockets 110 of the base 102 which are enclosed by the material of the device 100. However, other configurations of the weighted portion 108 can be used without departing from the scope of the invention.

Extending from base 102 are moveable portions or members 104, 106. The moveable members 104, 106 are configured to have less weight than the base 102, thereby allowing the moveable members 104, 106 to move and sway as the current of the water changes. In other words, the moveable members 104, 106 are allowed to be free floating at the bottom of the pool 10 to better simulate a submerged swimmer/bather. The moveable members 104, 106 may be integrally formed with the base 102 or the moveable members 104, 106 are separate pieces which may be attached to the base 102 using adhesive or other known methods, or the movable members 104, 106 may remain unattached from the base 102, provided that the buoyancy of the movable members 104, 106 is counterbalanced by a weighted portion that prevents the movable members 104, 106 from becoming detached from the base 102. In the illustrative embodiment shown, the moveable members 104, 106 are made from the same material as the base 102. However, the moveable members 104, 106 may be made from different material from the base 102 or with different visuals from the base 102 without departing from the scope of the invention.

As the device 100 may be positioned in the pool 10 at the same time as the swimmers/bathers are using the pool 10, the devices 100 are designed to not interfere with the swimmers/bathers. In the illustrative embodiment shown, the base 102 has a width of 9.6 inches a length of 23.1 inches and a height of 0.125 inches. Each of the moveable members 104, 106 has a width of 9.6 inches, a length of 3.9 inches, and a height of 9.6 inches. However, as previously discussed, the dimensions of the base 102 and moveable members 104, 106 may vary depending upon the size of swimmer/bather to be simulated.

Figure 4:
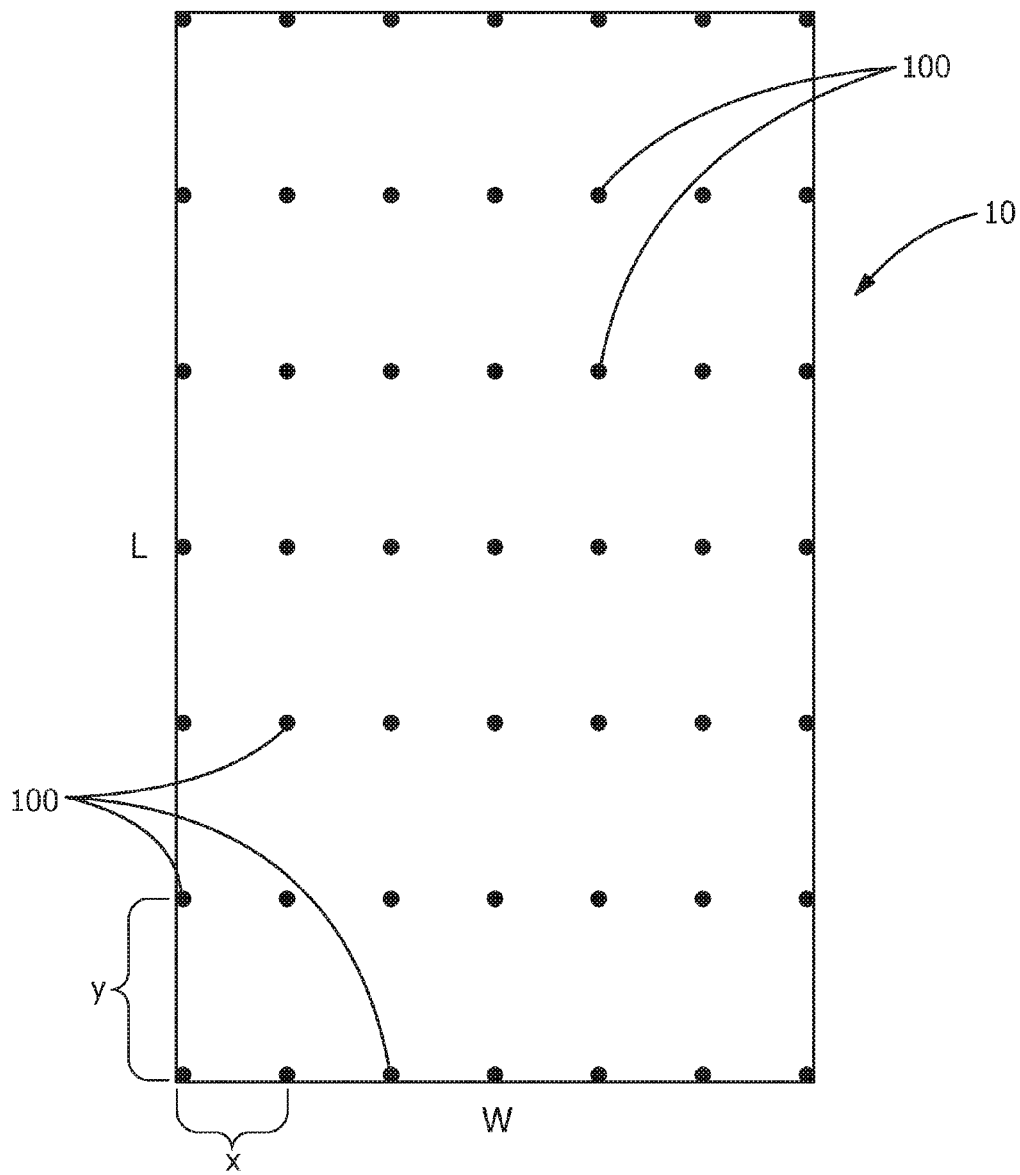
FIG. 4 is a diagrammatic view of an illustrative rectangular swimming pool with the calculated position of submersible devices shown.

In the illustrative embodiment shown in FIG. 4, the devices 100 are submerged as locations along the length L and the width W of the pool 10 to form a grid like pattern. In the embodiment shown, the pool is rectangular in shape.

The spacing of the devices 100 in the direction of the width W of the pool 10 is calculated by using the formula:

$$x = \frac{\text{width of pool}}{\sqrt{n} - 1},$$

where n is the number of devices 100.

The spacing of the devices 100 in the direction of the length L of the pool 10 is calculated by using the formula:

$$y = \frac{\text{length of pool}}{\sqrt{n} - 1},$$

where n is the number of devices 100.

However, as other shapes of pools may be used, the formulas used to calculate the spacing and positioning of the devices 100 may be modified to account for any irregularities in the shape of the pool.

Figure 5:
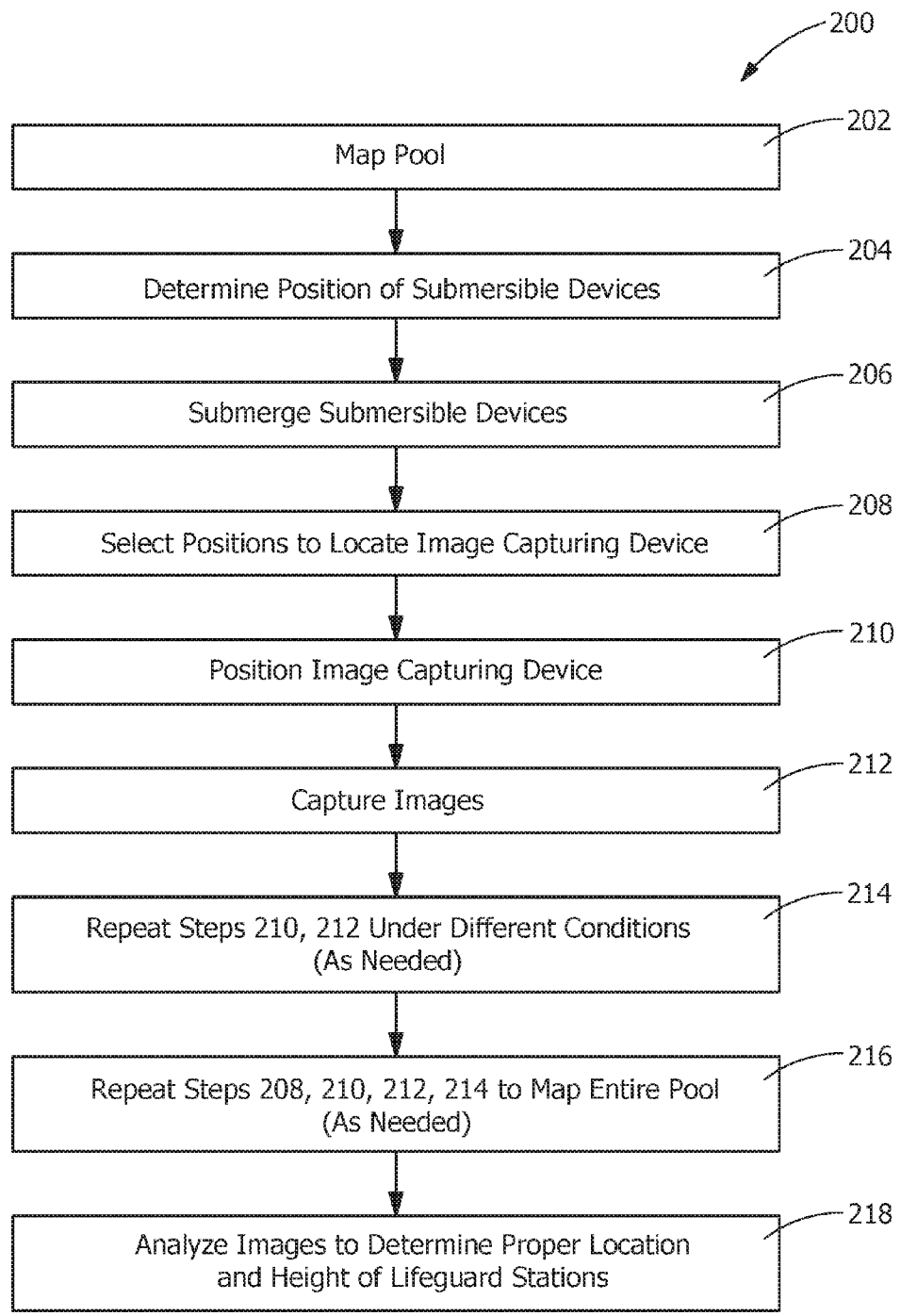
FIG. 5 is a block diagram illustrating an illustrative method of the present invention.

The imaging capturing device 30 and the devices 100 are used to facilitate the proper positioning of the lifeguard stations. As shown in FIG. 5, an illustrative method 200 for gathering and analyzing information is shown. In the illustrative embodiment, the pool 10 is mapped to determine the dimensions and configuration of the pool (step 202). The positioning of the devices 100 are then determined (step 204). Once the locations are determined, the devices 100 are submerged in the proper location (step 206). In other embodiments, locations are then selected to position the image capturing device 30 (step 206) based on the map of the pool, and in particular, any obstructions which interfere with sight lines that may be present. The image capturing device 30 is then positioned accordingly (step 208). Images are captured (step 210) from all image capturing equipment 34 located on the image capturing device 30, thereby allowing images to be captured at different heights. Images continue to be captured (step 212), as needed, as the conditions change. For example, images may be captured according to changing surface turbulence created by bathers, waves, wind, water spray features; turbidity caused by air entrainment from waves or bubble features; reflected images; glare from light; and/or lighting levels, design and positioning of light or lighting sources.

Once the imaging is complete at a particular location, the image capturing device 30 is moved to the next location (step 216) and the imaging capturing process is repeated. With all images captured, the information is analyzed (step 218) to determine the location and height of lifeguard stations that provide the best sightlines of the swimming pool to view from the surface of the water to the bottom of the pool shell for optimum safety of the swimmers/bathers.

While the method of FIG. 5 includes steps 202 through 218, the order in which the steps are performed may be varied. For example, step 208, selecting locations to position the image capturing device 30 based on the map of the pool, may be done at the same time as step 204, positioning devices 100 in the pool 10. In addition, other steps may be included without departing from the scope of the invention.

This system and method allows for the critical analysis of the pool space to identify the line of sight factors which affect the ability of a lifeguard to supervise swimmers/bathers and recognize someone in distress. This analysis includes using the submerged device 100 to evaluate the ability to see the device 100 under a variety of conditions. These conditions include: different distances and elevations between lifeguard and device 100 locations; surface turbulence created by bathers, waves, wind, water spray features; turbidity caused by air entrainment from waves or bubble features; reflected images; glare from light; lighting levels, design and positioning of light or lighting sources; water depth; background color of the pool 10 walls and bottoms; and sightline obstructions such as in-water fixtures, support pillars, on-deck play structures, etc.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A device for capturing images to facilitate the placement of lifeguard stations around a pool; the device comprising:
   a support member with multiple mounting stations provided thereon, the mounting stations being vertically aligned along a single vertical axis, the mounting stations are positioned at different elevations from a ground surface to conform to where eyes of a lifeguard are located depending upon heights of lifeguards or the lifeguard stations, the mounting stations are pivotably or rotatably mounted to the support member;
   imaging capturing equipment mounted on the mounting stations, the imaging capturing equipment having simultaneous shutter releases, the image capturing equipment and the mounting stations are configured to be positioned at a proper angle relative to a surface of water in the pool to properly capture images of objects in the pool;
   adjustable legs provided to allow the device to be free standing;
   a leveling measurement device, the leveling measurement device indicating when the support member is moved to a vertical position;
   wherein the device can be adjusted to position and maintain the support member in the vertical position.

2. The device as recited in claim 1, wherein the support member has three mounting stations.

3. The device as recited in claim 2, wherein a first mounting station is positioned 5.5 feet from the ground surface, a second mounting station is positioned 8.5 feet from the ground surface and a third mounting station is positioned 10.5 feet from the ground surface.

4. The device as recited in claim 1, wherein the leveling measurement device is a level that is mounted to the support member.

5. The device as recited in claim 1, wherein the image capturing equipment are cameras.

6. The device as recited in claim 1, wherein positioning members extend from the support member, the positioning members are used to stabilize the support member and align the support member.

7. The device as recited in claim 6, wherein the positioning members are ropes or cables which extend from proximate the top of the support member.

8. A device for capturing images to facilitate the placement of lifeguard stations around a pool or other body of water, the device comprising:
   a support member with multiple mounting stations provided thereon, the multiple mounting stations pivot, move or rotate relative to the support member, the mounting stations are aligned along a single axis, the mounting stations are positioned at different elevations from a ground surface to conform to where eyes of a lifeguard are located depending upon heights of lifeguards or the lifeguard stations;
   imaging capturing equipment mounted on the mounting stations, the imaging capturing equipment having simultaneous shutter releases, the image capturing equipment and the mounting stations are configured to be positioned at a proper angle relative to a surface of water in the pool or the other body of water to properly capture images of objects in the pool or the other body of water which simulate the refracted appearance of a human submerged bather/swimmer in the pool or the other body of water;
   a leveling measurement device, the leveling measurement device indicating when the support member is moved to a vertical position, thereby vertically aligning the mounting stations to prevent distortion or inaccuracy from the imaging capturing equipment based on vertical misalignment;
   wherein the device can be adjusted to position and maintain the support member in the vertical position and to allow the image capturing equipment to be positioned at an angle relative to the support member and relative to a surface of water in the pool or other body of water.

9. The device as recited in claim 8, wherein the support member has three mounting stations.

10. The device as recited in claim 9, wherein a first mounting station is positioned 5.5 feet from the ground surface, a second mounting station is positioned 8.5 feet from the ground surface and a third mounting station is positioned 10.5 feet from the ground surface.

11. The device as recited in claim 8, wherein the leveling measurement device is a level that is mounted to the support member.

12. The device as recited in claim 8, wherein the image capturing equipment are cameras.

13. The device as recited in claim 8, wherein legs cooperate with the support member to allow the device to be free standing.

14. The device as recited in claim 13, wherein a connection member connects the legs to the support member.

15. The device as recited in claim 14, wherein the legs are adjustable and the connection member is fixedly mounted to the support member.

16. The device as recited in claim 14, wherein the connection member is pivotally mounted to the support member.

17. The device as recited in claim 8, wherein positioning members extend from the support member, the positioning members are used to stabilize the support member and align the support member.

18. The device as recited in claim 17, wherein the positioning members are ropes or cables which extend from proximate the top of the support member.

* * * * *